(12) United States Patent
Hoffjann et al.

(10) Patent No.: US 7,546,981 B2
(45) Date of Patent: Jun. 16, 2009

(54) DRAIN SYSTEM FOR AN AIRCRAFT

(75) Inventors: Claus Hoffjann, Neu Wulmstorf (DE); Hansgeorg Schuldzig, Jork (DE); Harald Gruendel, Hamburg (DE); Hans-Juergen Heinrich, Hamburg (DE)

(73) Assignee: Airbus Deutschland GmbH (DE)

( * ) Notice: Subject to any disclaimer, the term of this patent is extended or adjusted under 35 U.S.C. 154(b) by 0 days.

(21) Appl. No.: 11/189,622

(22) Filed: Jul. 26, 2005

(65) Prior Publication Data
US 2006/0060712 A1 Mar. 23, 2006

Related U.S. Application Data

(60) Provisional application No. 60/591,332, filed on Jul. 27, 2004.

(30) Foreign Application Priority Data

Jul. 27, 2004 (DE) .................. 10 2004 036 296

(51) Int. Cl.
*B64D 1/00* (2006.01)
(52) U.S. Cl. ...................... 244/136
(58) Field of Classification Search ............... 244/136, 244/118.5, 130, 53 BB, 1 R, 134 B; 73/861.68; 239/171; 222/132
See application file for complete search history.

(56) References Cited

U.S. PATENT DOCUMENTS

| | | | | |
|---|---|---|---|---|
| 2,370,035 A | * | 2/1945 | Heymann | 244/118.5 |
| 2,706,408 A | * | 4/1955 | Holbrook | 73/861.68 |
| 3,455,743 A | * | 7/1969 | Huebscher et al. | 429/24 |
| 3,716,415 A | * | 2/1973 | Gagnon et al. | 429/24 |
| 4,275,603 A | * | 6/1981 | Kalocsay | 73/861.68 |
| 4,505,445 A | | 3/1985 | Allison | 244/134 |
| 5,098,036 A | * | 3/1992 | Brigham et al. | 244/134 R |
| 5,269,135 A | * | 12/1993 | Vermejan et al. | 60/226.1 |
| 5,655,732 A | * | 8/1997 | Frank | 244/1 R |

(Continued)

FOREIGN PATENT DOCUMENTS

DE 44 08 493 C1 2/1995

(Continued)

OTHER PUBLICATIONS

German Office Action, dated Mar. 31, 2008.

*Primary Examiner*—Tien Dinh
(74) *Attorney, Agent, or Firm*—Ostrolenk, Faber, Gerb & Soffen, LLP

(57) ABSTRACT

Drain masts of commercial aircraft need to be heated in order to prevent freezing caused by the low outside temperatures when the aircraft travels at a corresponding altitude. An exemplary embodiment described in the application pertains to a drain system for an aircraft that can be used for draining liquids or gases from the aircraft or for drawing air into the aircraft. In this case, the liquids or gases are heated by means of a coolant that receives its thermal energy from a thermal or electrochemical process being carried out on board the aircraft. Consequently, the waste heat produced by the thermal or electrochemical process being carried out on board the aircraft, for example, a fuel cell process, can be carried off outboard via the drain system. In addition, the coolant can be advantageously utilized for cooling the thermal or electrochemical process.

11 Claims, 2 Drawing Sheets

U.S. PATENT DOCUMENTS 6,834,831 B2 * 12/2004 Daggett .................. 244/58

FOREIGN PATENT DOCUMENTS

| DE | 4421833 | 1/1996 |
| DE | 102 16 361 A1 | 4/2003 |
| DE | 10142696 | 4/2005 |
| GB | 1255617 | 12/1968 |

* cited by examiner

DRAIN SYSTEM FOR AN AIRCRAFT

REFERENCE TO RELATED APPLICATIONS

This application claims the benefit of the filing date of U.S. Provisional Patent Application No. 60/591,332 filed Jul. 27, 2004 and of German Patent Application No. 10 2004 036 296.3 filed Jul. 27, 2004, the disclosure of which is hereby incorporated by reference.

FIELD OF THE INVENTION

The present invention pertains to drain systems for an aircraft. In particular, the present invention relates to a drain system for an aircraft, the utilization of a drain system in an aircraft as well as an aircraft that is equipped with a corresponding drain system.

TECHNOLOGICAL BACKGROUND

At the cruising altitudes of modern commercial aircraft, the outside temperatures lie as low as −60° C. Liquids accumulated from the galley area or hand wash basins, as well as from the cargo compartment drain, cannot be discharged outboard without being heated first, namely because they would otherwise freeze immediately and form ice chunks such that the drain mast would be clogged. This is the reason why modern drain masts are heated.

Drain mast or drain systems according to the state of the art have the disadvantage, for example, that the heating of the liquid to be drained is associated with an increased energy demand. This additional energy needs to be generated by the on-board supply system. The additional heating elements provided in known drain systems may also lead to an increased space requirement.

SUMMARY OF THE INVENTION

According to an exemplary embodiment of the present invention, a drain system for an aircraft is provided that comprises a mast and a coolant, wherein the mast can be used for draining liquids or gases from the aircraft or for drawing air into the aircraft, and wherein the mast can be heated by the coolant or a heat exchanger.

The liquids to be drained may comprise or consist of, for example, gray water, i.e., slightly contaminated water that is accumulated, for example, from hand wash basins and galley sinks in the kitchen area of the aircraft. The gases to be drained may comprise or consist of, for example, exhaust gases produced by a thermal process or electrochemical process being carried out on board the aircraft, for example, a fuel cell process.

The liquids or gases to be drained can be heated within the drain system in this fashion in order to prevent freezing or the formation of ice chunks. The drain system also makes it possible to draw outside air into the aircraft. The outside air can be delivered, for example, to a thermal process or electrochemical process being carried out on board the aircraft or to a fuel cell process. This advantageously results in a drain system that is not only suitable for draining liquids or gases from the aircraft, but also for drawing outside air into the aircraft.

According to another exemplary embodiment of the present invention, the coolant can be delivered to a thermal process or electrochemical process being carried out on board the aircraft. In this case, the coolant can be heated by the thermal process or electrochemical process and used for cooling the thermal or electrochemical process.

Since the waste heat produced by a thermal process or electrochemical process being carried out on board the aircraft, for example, a fuel cell process, needs to be discharged outboard anyhow, it is advantageous that this waste heat can be carried off via the housing of the drain system. In this case, the heat required for heating the drain system is simultaneously made available in order to prevent the liquid or the gases discharged via the drain system from freezing at cruising altitudes or in other cold climate conditions.

According to another exemplary embodiment of the present invention, the drain system also comprises a pressure control unit, wherein the mast has an end region and said end region is angled relative to the aircraft heading by an angle between approximately 0° and 45° in order to draw air into the aircraft. This means that dynamic pressure is built up in the mast due to the air speed. This dynamic pressure can be adjusted with the aid of the pressure control unit.

The arrangement of the mast relative to the aircraft heading by an angle between approximately 0° and 45° may make it possible to take in outside air under a correspondingly high dynamic pressure. If so required, the dynamic pressure can subsequently be lowered accordingly with the aid of the pressure control unit such that the drawn-in outside air can then be delivered, for example, to a fuel cell process being carried out on board the aircraft with a desired process pressure and a desired temperature.

According to another exemplary embodiment of the present invention, the drain system also comprises an air compressor and a change-over valve, wherein the dynamic pressure can be generated by the air compressor, and wherein the air compressors can be changed over to cabin air by means of the change-over valve.

In this case, it may be advantageous that the dynamic pressure required for supplying the on-board fuel cell can also be generated if the air speed is not sufficiently high or if the aircraft is not airborne. The air compressor may also use the cabin air in this case such that a corresponding pre-heating process can be at least partially eliminated.

According to another exemplary embodiment of the present invention, the drain system also comprises a cooling surface, wherein the coolant can be cooled with the aid of this cooling surface before it is delivered to the thermal process or electrochemical process.

This may make it possible to utilize the low outside temperature for additionally lowering the temperature of the coolant. In this case, the cooling process takes place within the drain system with the aid of said cooling surface such that additional components are not required. The invention makes it possible to skillfully utilize the low outside temperatures while simultaneously achieving a lower space requirement of the entire arrangement.

According to another exemplary embodiment of the present invention, the liquid to be drained comprises or consists of gray water accumulated on board the aircraft during its operation, wherein the gases to be drained comprise or consists of the exhaust air produced by the thermal process or electrochemical process being carried out on board the aircraft.

Consequently, four functions may be integrated into one arrangement, namely the heating of the drain mast or mast, the cooling of a thermal or electrochemical process being carried out in the interior of the aircraft, e.g., a fuel cell process, the delivery of outside air to this process and the draining of excess gases produced by this process. The arrangement is also believed to provide the advantage that the cooling function can be realized without having to manipulate the cell structure of the aircraft, i.e., an additional cooler or an additional air intake pipe is not required on the skin of the aircraft for cooling purposes. This means that an increase in the air resistance may be prevented.

According to another exemplary embodiment of the present invention, the drain system also comprises an electric heater, wherein the mast can be additionally heated with the aid of this electric heater.

The electric heater may make it possible to deliver more thermal energy to the mast. This may be required, for example, if the fuel cell on board the aircraft does not generate sufficient excess thermal energy for ensuring that the drain mast can be adequately heated. According to another exemplary embodiment of the present invention, it is possible to also switch on a heat pump process in order to increase the heating power for heating the mast or the cooling power for cooling the thermal or electrochemical process.

The heat pump process may be carried out in series with the cooling medium such that a higher temperature level of the heaters for the drain masts and consequently the flow temperature of the cooler can be achieved. This may make it possible, for example, to increase the efficiency of the fuel cell or the drain speed of the liquid or the gases through the mast, tube or pipe.

Another exemplary embodiment of the present invention relates to a method for draining liquids or gases from an aircraft or for drawing air into an aircraft by means of a drain system, wherein the drain system comprises a mast and a coolant. According to this method, the mast is heated by the coolant or by a heat exchanger, and the mast can be used for draining liquids or gases from the aircraft or for drawing air into the aircraft.

The drained liquids or gases or the outside air taken in can be heated within the drain system in this fashion. Consequently, freezing and the formation of ice chunks may effectively be prevented.

BRIEF DESCRIPTION OF THE DRAWINGS

Exemplary embodiments of the present invention are described below with reference to the figures.

DESCRIPTION OF PREFERRED
EMBODIMENTS OF THE INVENTION

Identical or similar elements are identified by the same reference symbols in the following description of the figures.

Figure 1:
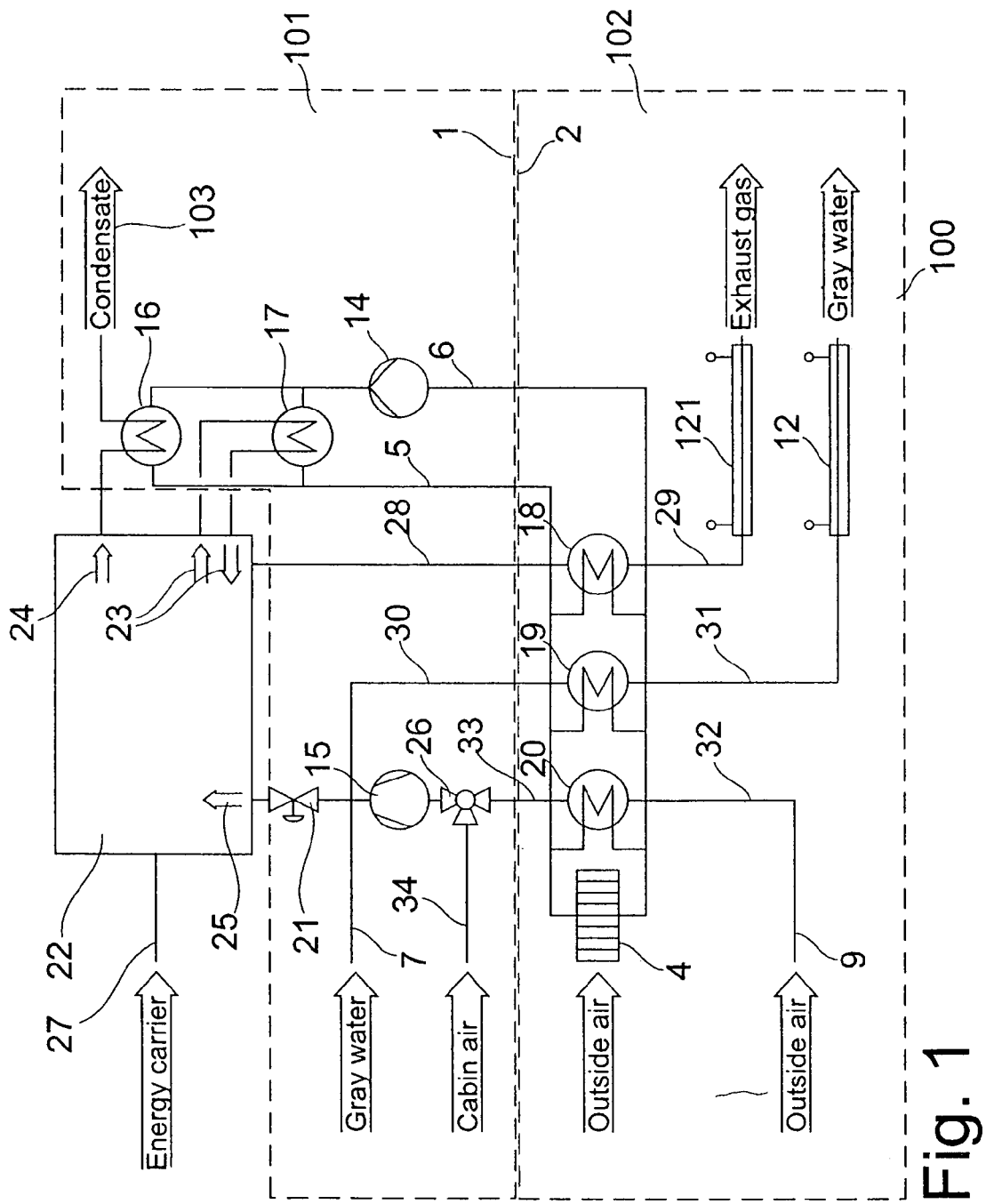
FIG. 1 shows a schematic representation of a cooling/heating process according to an exemplary embodiment of the present invention.

FIG. 1 shows a schematic representation of a cooling/heating process according to an exemplary embodiment of the present invention. As can be taken from FIG. 1, the drain system 100 according to the invention forms a component of the cooling and heating systems required on board an aircraft, for example, for draining gray water or gases from the aircraft or for drawing outside air into the aircraft. The drain system 100 comprises a series of heat exchangers 16, 17, 18, 19, 20 that are designed for advantageously utilizing the elevated temperature of the exhaust air produced by a thermal or electrochemical process being carried out on board the aircraft, as well as the relatively low temperature outside the aircraft. Heat exchanges of this type are well known from the state of the art and consequently not described in greater detail. However, it should be noted that a variety of different systems may be considered for use as heat exchangers. In this respect, it should be noted that heat is respectively transferred from the coolant in the circuit 5, 6 to the corresponding pipes and masts 23, 24, 28, 29, 30, 31, 32, 33 and the gases or liquids contained therein (or vice versa).

The heat exchanger 16 comprises a heat exchanger for a condenser that is adapted for condensing the exhaust air 24 produced by the thermal or electrochemical process 22, for example, a fuel cell process. The resulting condensate 103 is drained. An energy carrier 27 delivered to the thermal or electrochemical process 22 is essentially converted, for example, into energy, oxygen and fresh water while additional air 25 is admixed. The excess heat produced during this process can be carried off with the exhaust air 24. The thermal energy of the exhaust air 24 is partially transferred into the coolant circuit 5, 6 by means of the heat exchanger 16.

The coolant circuit 5, 6 comprises a cooling-heating medium return line 5 and a cooling-heating medium flow line 6. The cooling medium or heating medium may comprise, for example, a corresponding liquid that is conveyed within a pipe or pipeline system 5, 6.

The heat exchanger 17 may make it possible to cool the thermal process 22 at the corresponding location and the corresponding time in the form of a cooling process 23. In this respect, the efficiency of the thermal or electrochemical process can be increased. In addition, the cooling process 23 elevates the temperature in the flow line 6 of the cooling circuit such that the coolant can now be utilized for heating water or air.

The liquid used as the heating or cooling medium is recirculated by means of a circulating pump 14. The cooling or heating power can be regulated with the pump speed and a correspondingly controlled additional cooler/heater of corresponding dimensions. The exhaust gases produced by the thermal or electrochemical process 22 are discharged from the fuel cell arrangement or the reactor 22 through corresponding exhaust gas lines 28, 29. The exhaust gases can be heated with the aid of heat exchangers 18 in order to prevent the exhaust gases from freezing out during their discharge from the aircraft and to prevent the water contained in said exhaust gases from freezing up the exhaust gas line 29. It is also possible to provide a separate heater for the drain mast or pipe 29 in addition to the heat exchanger 18 for heating the exhaust gases by means of the cooling circuit. This additional heater may comprise, for example, an electric heater 121. Consequently, the exhaust pipes 29 are effectively prevented from freezing up.

Another heat exchanger 19 may be provided for utilizing the heat made available by the coolant circuit 5, 6 for heating the gray water accumulated on board the aircraft during its operation before it is drained from the aircraft, as well as for protecting the pipelines 30, 31 that convey the drain water out of the aircraft from freezing up. In addition to the heat exchanger 19, heaters 12 may be provided for electrically heating the gray water drain masts 31 such that the gray water outlet 10 is also prevented from freezing up if the coolant circuit 5, 6 is unable to deliver sufficient thermal energy. The heaters 12 and 121 may also be combined into a single heater.

A heat exchanger 20 is provided for heating ram air. The ram air includes outside air that is delivered into the drain system 100 from outside through a ram air pipe 32. The end region of the mast 9 for drawing air into the aircraft is angled between the approximately 0° and 45° relative to the aircraft heading such that the air speed causes dynamic pressure to build up in the mast 9. The thusly captured ram air is then delivered to the heat exchanger 20 via the ram air pipe 32 and heated to the corresponding process temperature therein. A pipeline 33 is used for delivering the heated ram air to a change-over valve 26. This change-over valve makes it possible to deliver cabin air additionally or alternatively to the ram air.

The cabin air delivered via the line 34 and the ram air delivered via the line 33 can then be additionally compressed with the aid of the compressor 15. This may be necessary, in particular, if the aircraft travels with an insufficient speed or the aircraft is not airborne such that a sufficient dynamic pressure of the ram air cannot be generated. The compressor 15 comprises, for example, an electric compressor that is supplied with energy by internal sources on board the aircraft.

The pressure of the delivered ram air or cabin air can be regulated accordingly with the aid of a downstream pressure control valve 21. The outside air heated in accordance with the invention can subsequently be delivered to the thermal or electrochemical process 22 in the form of additional air 25.

As may be taken from FIG. 1 the drain system is partially arranged on the inner side 101 of the aircraft and partially on the outer side 102 of the aircraft. The boundary between the inner region 101 and the outer region 102 is defined by the fuselage 1 and its skin 2. In this case, the skin 3 (not shown in FIG. 1) of the drain system 100 at least partially encloses the part of the drain system 100 arranged in the outer region 102.

A cooler 4 is used for additionally cooling down the coolant flowing through the cooling circuit 5, 6 after it has passed through the heat exchangers 16, 17, 18, 19 and 20. The cooler 4 is situated in the outer region 102 of the aircraft and in direct contact with the outside air. This ensures an effective cooling of the coolant if the aircraft is at a corresponding altitude and the outside temperature is correspondingly low.

Figure 2:
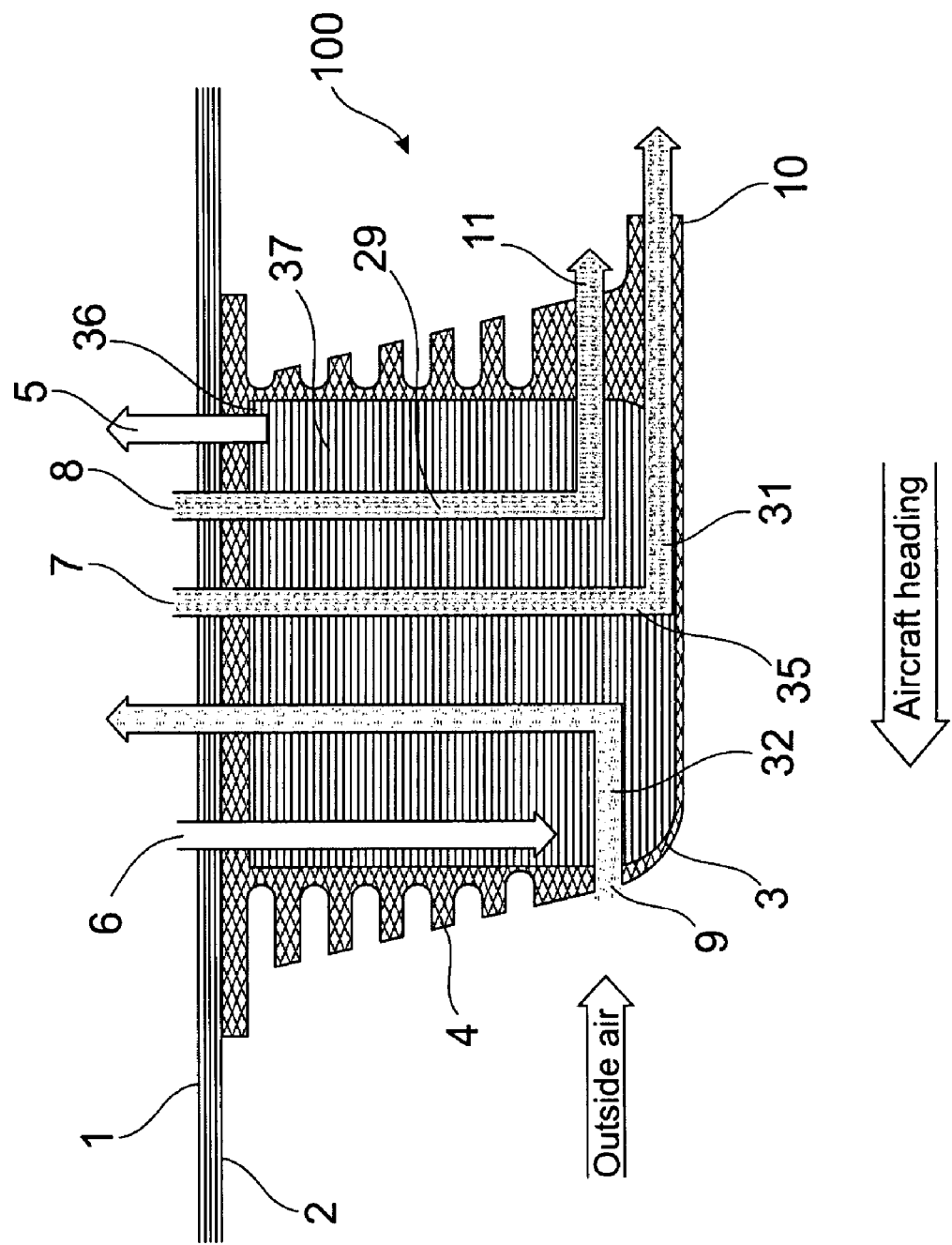
FIG. 2 shows a schematic representation of a drain system according to an exemplary embodiment of the present invention.

FIG. 2 shows a schematic representation of an embodiment of a drain system according to the present invention. One can ascertain from FIG. 2 that a substantial portion of the drain system 100 is arranged in the outer region of the aircraft 1, and that the drain system comprises a skin 3 that contains a cooler 4 with cooling ribs. The drain system 100 also comprises gray water drain masts 7, 31 that serve for discharging liquids from galleys and hand wash basins. These pipes 7, 31 are encased in a liquid heater 37, wherein the delivery line for the heating liquid is arranged on the outlet end 35 of the mast 31 and the return line is arranged on the upper end 36 of the liquid heater 37.

The liquid heater 37 comprises heat exchangers 18, 19, 20 and is surrounded by an electric heater (not shown in FIG. 2) in order to also ensure the heating function when the liquid heater is inactive or delivers insufficient thermal energy.

The flow line 6 of the liquid heater 37 is fed by the cooling circuit of a thermal or electrochemical process (see FIG. 1), for example, of a fuel cell process, in which the cell cooling or the water condensation is realized with the aid of this cooling circuit. The return line 5 of the liquid heater 37 on the side of the drain mast extends through a cooler 4 arranged on the skin 3 of the drain mast housing. This may ensure an efficient cooling of the coolant in the return line 5. The cooling liquid is cooled down to the required cooling temperature for the thermal or electrochemical process being carried out on board the aircraft in the return line 5.

The heating or cooling liquid is also recirculated by means of a circulating pump (not shown in FIG. 2). The cooling or heating power can be regulated with the pump speed and a correspondingly controlled additional cooler/heater of corresponding dimensions.

It is also possible to switch on a heat pump process between the on-board thermal or electrochemical process to be cooled and the heater of the drain system 100 in order to increase the heating power on the side of the drain mast and the cooling power in the interior of the aircraft. This makes it possible, for example, to optimize the efficiency of a fuel cell arrangement in the interior of the aircraft.

A ram air opening 9 with a pipe 32 connected thereto is situated on the front side of the drain system 100, wherein the air required for the thermal or electrochemical process (see reference symbol 22 in FIG. 1) is delivered via said pipe and heated to the process temperature by the liquid heater 37.

An outlet pipe 11 for discharging any excess gas 8 produced by a fuel cell process (so-called purging) is situated on the rear side of the drain system 100. The pipe 29 also needs to be heated because this excess gas may contain moisture.

The described drain system 100 makes it possible to carry off the waste heat produced by a thermal or electrochemical process being carried out on board an aircraft, for example, a fuel cell process, via the housing of the so-called drain mast and to simultaneously generate the thermal energy required by the drain system 100 in order to prevent the liquid being discharged from the drain system 100 from freezing when the aircraft is at a corresponding altitude or exposed to other cold ambient conditions.

It is believed that an advantage of the drain system can be seen in the integration of four functions into one arrangement, namely the heating of the drain system 100, the cooling of a thermal or electrochemical process being carried out in the interior of the aircraft, e.g., a fuel cell process, the supply of outside air to this process and the discharge of excess gases produced by this process. The arrangement may also provide the advantage that the cell structure of the aircraft does not have to be manipulated in order to realize the cooling function, i.e., an additional cooler and an air supply pipe for cooling purposes are not required on the skin of the aircraft. This means that a significant increase in the aerodynamic drag may be prevented.

The suction-type intake of the air required by the fuel cell via the drain mast is realized with the aid of a ram air pipe 32 and provides the additional advantage that the ram air can be pre-heated with the cooling/heating medium in accordance with the countercurrent principle such that it can be subsequently delivered to the fuel cell with the optimal operating temperature.

The realization of the invention is not limited to the preferred embodiment illustrated in the figures. On the contrary, it would be conceivable to realize numerous variations that utilize the described solution and the principle of the invention in embodiments with a basically different design.

In summation, it should be understood that the term "comprising" does not preclude any other elements or steps, and that the terms "one" or "a" do not preclude a plurality of the element referred to. It should also be understood that characteristics or steps that were disclosed in connection with one of the above-described embodiments could also be utilized in combination with other characteristics or steps disclosed in connection with other above-described embodiments. The reference symbols used in the claims should not be understood in a restrictive sense.

What is claimed is:

1. A drain system for an aircraft, comprising:
a mast arranged and operable to perform at least one of: (1) drawing ram air into the aircraft, and (2) draining liquids or gases from the aircraft, the mast further being operable to deliver the ram air to a thermal or electrochemical process being carried out on board the aircraft;
a change-over valve operable to deliver cabin air to the thermal or electrochemical process alternatively or additionally to the ram air;
an air compressor operable to compress air to be delivered to the thermal or electrochemical process;
a pressure control unit operable to regulate the pressure of the air to be delivered to the thermal or electrochemical process; and
a tubing containing a coolant; the tubing being positioned and operable to conduct a portion of the heat generated by the coolant to heat the mast; the tubing being further positioned and operable to deliver the coolant to the thermal or electrochemical process; and
the tubing being further positioned and operable to conduct a portion of the heat generated by the thermal or electrochemical process to heat the coolant.

2. The drain system of claim 1, wherein:
the mast has an end region that is angled relative to the aircraft heading by an angle between approximately 0° and 45° and the mast is operable to draw air into the aircraft such that the air speed of the traveling aircraft causes dynamic pressure to build up in the mast; and
the pressure control unit is operable to regulate a dynamic pressure of the air.

3. The drain system of claim 1, further comprising:
a cooling surface positioned and operable to cool the coolant by the cooling surface before the coolant is delivered to the thermal or electrochemical process.

4. The drain system of claim 1,
wherein liquids to be drained comprise gray water accumulated on board the aircraft during its operation; and
the gases to be drained comprise exhaust air produced by the thermal or electrochemical process.

5. The drain system of claim 1,
wherein the mast penetrates a skin of the aircraft; and
at least part of the drain system is arranged outside the aircraft on an underside of the aircraft fuselage.

6. The drain system of claim 1, further comprising:
an electric heater which is operable to further heat the mast.

7. The drain system of claim 1, further comprising:
a heat pump operable to be switched on to increase heating power for heating the mast or cooling power for cooling the thermal or electrochemical process.

8. An aircraft comprising a drain system of claim 1.

9. The drain system of claim 1, further comprising:
a fuel cell operable to perform the thermal or electrochemical process.

10. The drain system of claim 1, wherein the tubing forms a closed loop which does not enter or exit a device performing the thermal or electrochemical process.

11. A drain system for an aircraft, comprising:
a mast arranged and operable to perform at least one of: (1) drawing air into the aircraft, and (2) draining liquids or gases from the aircraft, the mast having an end region that is angled relative to the aircraft heading by an angle between approximately 0° and 45° and the mast is operable to draw air into the aircraft such that the air speed of the traveling aircraft causes a dynamic pressure to build up in the mast;
one of a heat exchanger and a tubing containing a coolant and being positioned and operable to heat the mast;
an air compressor operable to generate the dynamic pressure;
a pressure control unit operable to regulate the dynamic pressure; and
a change-over valve operable to switch the air compressor to receive cabin air.

* * * * *